(No Model.)

F. PARDO.
COFFEE POT AND BOILER APPLIANCE.

No. 590,626. Patented Sept. 28, 1897.

WITNESSES

INVENTOR
Forester Pardo
By John Shedletsky
Attorney

UNITED STATES PATENT OFFICE.

FORESTER PARDO, OF PLAQUEMINE, LOUISIANA.

COFFEE-POT AND BOILER APPLIANCE.

SPECIFICATION forming part of Letters Patent No. 590,626, dated September 28, 1897.

Application filed March 16, 1897. Serial No. 627,773. (No model.)

*To all whom it may concern:*

Be it known that I, FORESTER PARDO, a citizen of the United States, residing at Plaquemine, in the parish of Iberville and State of Louisiana, have invented certain new and useful Improvements in Coffee-Pot and Boiler Appliances; and I do hereby declare the following to be a full, clear, and exact description of the invention, such as will enable others skilled in the art to which it appertains to make and use the same.

This invention provides an apparatus to be used in connection with drip-coffee pots employing a separate boiler for the water and certain devices by which when the water comes to a boil steam will be first introduced into the coffee-pot to infuse the coffee, after which the water is slowly conveyed into the pot and an alarm sounded when the operation of making the beverage is completed.

In obtaining the above objects the invention consists in the combination, with a drip-coffee pot, of a boiler, float mechanism for regulating the discharge of water from the boiler, and a device for sounding an alarm at the completion of the aforesaid operation.

The invention further consists in the particular construction and combination of the parts, as will be hereinafter fully set forth, and specifically pointed out in the claims.

Figure 1:
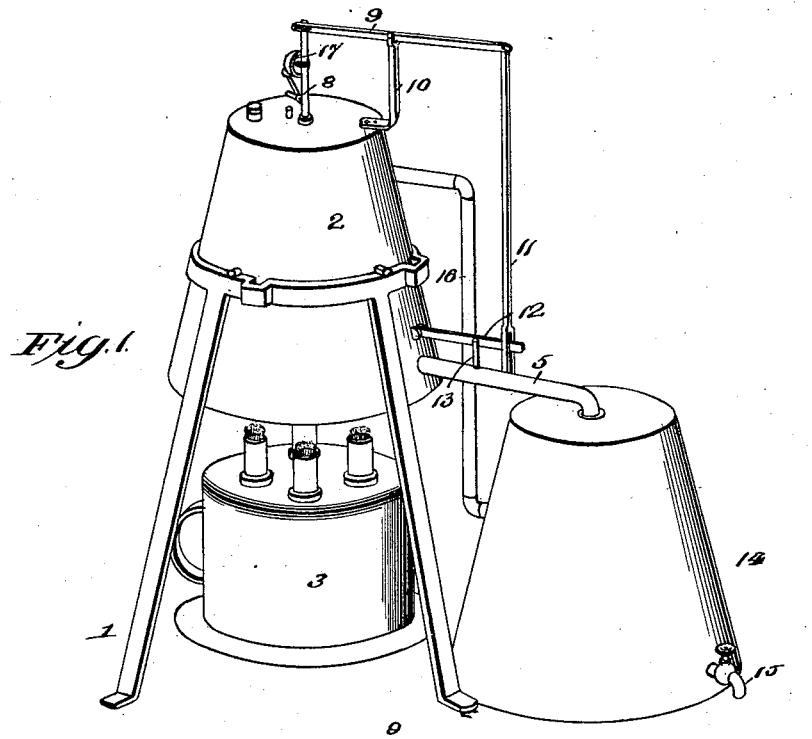
Figure 2:
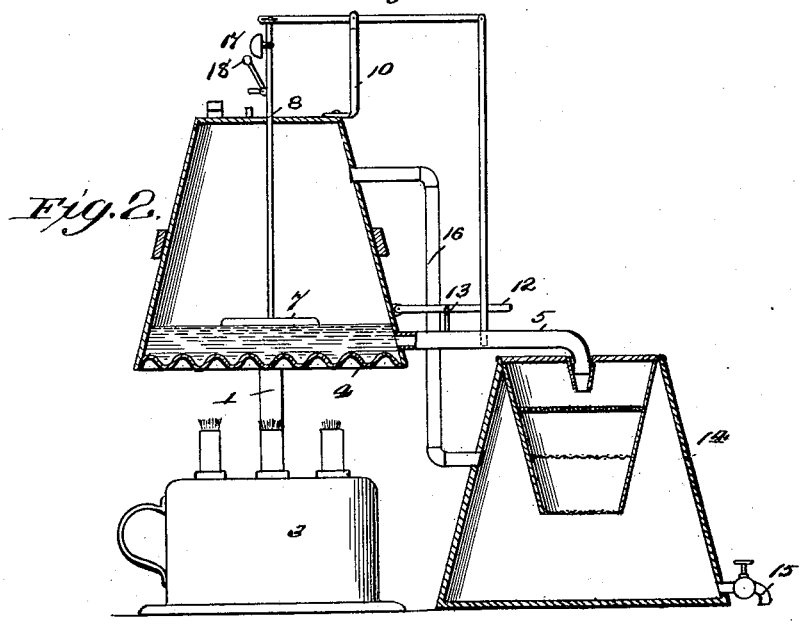
Figure 3:
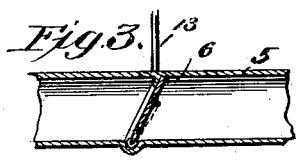

In the accompanying drawings, forming part of this specification, Figure 1 is a perspective view of my improved apparatus for automatically making coffee or similar beverages. Fig. 2 is a vertical sectional view through the apparatus. Fig. 3 is a detail view.

Referring to the drawings by numerals, 1 designates a suitable open-work frame which is adapted to support the boiler 2 therein and providing for a lamp 3, located beneath said boiler. The lamp may be of any approved style which is used in connection with the operation of making coffee or other similar beverages, the lamp shown having a plurality of wicks arranged in a circle. The boiler 2 is preferably cylindrical and slightly tapered upward, the under side or bottom 4 being of copper and corrugated, as shown, to increase the surface upon which the heat from the lamps will act to thereby more quickly heat the water contained in said boiler. This particular construction of the bottom also tends to retain the heat, and in practical use it has been found that it effectually aids in the heating of water. Any particular style of handles may be attached to the boiler and the top is provided with an ordinary filling-opening to receive an ordinary funnel, the said opening being closed by a cap. At the lower end of the boiler, on one side thereof, is located a spout 5, provided with a valve or cock 6.

7 designates a float which is located within the boiler and is provided with a vertical rod 8, extending through the cover a suitable distance above the same. This rod is connected to a horizontal lever 9, fulcrumed at an intermediate point in the bracket 10, extending from the boiler 2, the end of said lever which is engaged by the vertical rod having a slot to permit a vibration of the said rod. To the outer end of the lever 9 is connected a depending rod 11, connected at its lower end to the forward end of a lever 12, said lever being fulcrumed at its rear end between ears extending from the boiler-wall, and at an intermediate point it is connected to the operating-rod 13 of the valve 6. Below the pipe 5, which contains this valve 6, is positioned an ordinary drip-coffee pot 14, having the usual bags upon which the coffee is placed and an upper strainer through which the water is to pass on its way to the coffee, the spout fitting tightly in the opening in the lid or cover of the pot. This coffee-pot may be provided with the usual draw-off cock 15. Extending from the upper part of this coffee-pot to the upper part of the boiler is a pipe or conduit 16 for the purpose of shutting off communication between the two devices.

From the foregoing description, in connection with the accompanying drawings, the construction of my improved apparatus will be readily understood, and in the operation of making coffee or other beverages of this character the several parts will be automatically operated. For instance, after a sufficient quantity of water has been placed in the boiler 2 and the float brought into position slightly above the surface of said water the lamp is then lighted, and when the water in the boiler comes to a boil the steam which accumulates in the upper part will be conducted through the pipe 16 into the coffee-pot to infuse the coffee, after which the float will be operated or raised and depress the outer end of the lever 9, which being connected to the lever 12 will manipulate the valve 6 through the intervention of the rod 13, thereby opening the discharge-spout and permitting the water in the boiler to flow into the coffee-pot. In order that the valve may not be operated too quickly by the lowering of the float as the water passes out of the boiler, the lower end of the rod 11 is provided with an elongated slot for this purpose.

In connection with the apparatus hereinbefore described I provide the float-rod 8 with a bell 17, rigidly connected thereto, the clapper 18 of said bell being provided with a foot which strikes a projection on the top of the boiler when the float reaches the limit of its downward movement. This will sound an alarm when the water from the boiler has been discharged into the coffee-pot and consequently announce the completion of the operation of making the beverage.

The construction shown and described herein presents an apparatus which is very useful and does not require the attention of the person who is making the coffee and is particularly applicable in cases where parties have to rise early and desire a cup of coffee before starting out. With this device the water may be placed in the boiler and everything gotten ready for the process of making coffee, and by simply lighting the lamp the rest of the operation will be accomplished automatically and the alarm sounded when the beverage is ready. The apparatus can be supported upon a table or any convenient place to suit the accommodations of the user.

Having thus described my invention, what I claim as new, and desire to secure by Letters Patent, is—

1. The combination with a coffee-pot or similar receptacle, of a boiler connected to the upper end thereof by a valve pipe or spout, a lamp or heating device located below the boiler, a float located within said boiler and connected to the valve by interposed levers and rods, and a pipe connecting the upper end of the boiler to the upper end of the pot, substantially as shown and for the purpose set forth.

2. The combination with a drip-coffee pot or similar receptacle, of a boiler connected thereto by a valved pipe or spout, a float located within the boiler and connected to the valve by the intervention of levers and rods, the connection at one point providing an elongated slot, a bell attached to one of the connecting-rods and operated when the float reaches the limit of its downward movement, and a steam-outlet pipe extending from the boiler and communicating with the coffee-pot, substantially as shown and for the purpose set forth.

In testimony whereof I have signed this specification in the presence of two subscribing witnesses.

FORESTER PARDO.

Witnesses:
JAS. M. RHODE, Jr.,
F. W. DARDEMY.